United States Patent [19]

Ciokajlo et al.

[11] Patent Number: 5,167,488
[45] Date of Patent: Dec. 1, 1992

[54] CLEARANCE CONTROL ASSEMBLY HAVING A THERMALLY-CONTROLLED ONE-PIECE CYLINDRICAL HOUSING FOR RADIALLY POSITIONING SHROUD SEGMENTS

[75] Inventors: John J. Ciokajlo, Cincinnati; Ambrose A. Hauser, Wyoming, both of Ohio

[73] Assignee: General Electric Company, Cincinnati, Ohio

[21] Appl. No.: 725,114

[22] Filed: Jul. 3, 1991

[51] Int. Cl.⁵ .......................... F01D 25/08; F01D 5/08
[52] U.S. Cl. ........................ 415/175; 415/139
[58] Field of Search ............. 415/175, 138, 139, 171.1, 415/173.1, 173.2, 199.4, 199.5

[56] References Cited

U.S. PATENT DOCUMENTS

| | | | |
|---|---|---|---|
| 2,623,728 | 12/1952 | Feilden et al. | 415/209.3 |
| 2,928,586 | 3/1960 | Hart . | |
| 2,995,294 | 8/1961 | Warnken . | |
| 3,024,968 | 3/1962 | Payne et al. . | |
| 3,393,894 | 7/1968 | Redsell | 415/199.5 |
| 3,918,832 | 11/1975 | Shuttleworth et al. | 415/217 |
| 4,363,599 | 12/1982 | Cline et al. | 415/173.2 |
| 4,384,822 | 5/1983 | Schweikl et al. | 415/115 |
| 4,426,191 | 1/1984 | Brudill et al. | 415/189 |
| 4,524,980 | 6/1985 | Lillibridge et al. | 415/175 |
| 4,893,984 | 1/1990 | Davison et al. | 415/48 |

FOREIGN PATENT DOCUMENTS

| | | | |
|---|---|---|---|
| 192903 | 11/1983 | Japan | 415/175 |
| 259711 | 12/1985 | Japan | 415/175 |
| 2169356 | 7/1986 | United Kingdom | 415/175 |

*Primary Examiner*—Edward K. Look
*Assistant Examiner*—Michael S. Lee
*Attorney, Agent, or Firm*—Jerome C. Squillaro

[57] ABSTRACT

A clearance control assembly in a gas turbine engine includes several stages of cylindrical turbine shroud rings and a one-piece continuous cylindrical housing surrounding the shroud rings in radially outward spaced relation. Each shroud ring is composed of at least a pair of semi-cylindrical segments mounted to the housing. The shroud ring segments are radially positioned by thermal expansion and contraction of the housing in response to temperature-controlled air flow between the housing and shroud segments. Coupling elements joins together opposite edge portions of adjacent shroud ring segments to permit axial movement of the shroud segments toward and away from one another. Lands which protrude outwardly from the housing interior and shroud ring segment exteriors are located between the housing and shroud segments for defining several spiral channels for air flow about the interior of the housing and exterior of the shroud segments. Conduits are provided for supplying a flow of temperature-controlled air to the spiral channels between the housing and shroud segments.

19 Claims, 6 Drawing Sheets

CLEARANCE CONTROL ASSEMBLY HAVING A THERMALLY-CONTROLLED ONE-PIECE CYLINDRICAL HOUSING FOR RADIALLY POSITIONING SHROUD SEGMENTS

BACKGROUND OF THE INVENTION

1. Field of the Invention

The present invention relates generally to gas turbine engines and, more particularly, to a clearance control assembly employing a one-piece continuous cylindrical housing for radially positioning shroud segments in response to temperature-controlled air flow in spiral passages defined between the housing and shroud segments.

2. Description of the Prior Art

Gas turbine engines typically include a core engine having a compressor for compressing air entering the core engine, a combustor where fuel is mixed with the compressed air and then burned to create a high energy gas stream, and a first or high pressure turbine which extracts energy from the gas stream to drive the compressor. In aircraft turbofan engines, a second turbine or low pressure turbine located downstream from the core engine extracts more energy from the gas stream for driving a fan. The fan provides the main propulsive thrust generated by the engine.

The engine components of the turbine and compressor includes a number of blades attached to a plurality of rotating rotor discs which are surrounded by a stationary shroud composed of axially arranged segments. In order to maintain engine efficiency, it is desirable to keep to a minimum the radial space, gap, or clearance between the tips of the rotor blades and the shroud segments. One of the major factors affecting efficiency of a gas turbine engine is this radial clearance between the adjacent rotating and non-rotating components.

If the radial clearance is too great, an unacceptable degree of gas leakage will occur with a resultant loss in efficiency. If the radial clearance is too little, there is a risk that under certain conditions contact will occur between the components.

The potential for contact occurring is particularly acute when the engine rotational speed is changing, either increasing or decreasing, since temperature differentials across the engine frequently result in the rotating and non-rotating components radially expanding and contracting at different rates. For instance, upon engine accelerations, thermal growth of the rotor typically lags behind that of the casing. During steady-state operation, the growth of the casing ordinarily matches more closely that of the rotor. Upon engine decelerations, the casing contracts more rapidly than the rotor.

Active control mechanisms, usually mechanically or thermally actuated, have been proposed in the prior art to maintain blade tip clearance substantially constant. Current turbofan engines have active control mechanisms only on high and low pressure turbines while the latter stages of the compressor, at best, have the rotor disks heated or cooled to control rotor blade-shroud clearances.

Typically, the engine compressor has an inner casing formed by two 180° casing halves, or split casings, over its latter stages The split casings are attached together at horizontal flanges. During engine operation, the compressor is pressurized, causing the inner casing to assume a slightly oval configuration. The rotor blade-shroud clearances must be preset larger than desired in order to compensate for the oval configuration and avoid rubbing of the rotor blade against the shroud.

This split casing construction of the compressor inner casing with large preset compressor rotor blade-shroud clearances to avoid blade tip and shroud rubs results in reduced performance of and increased fuel consumption by the engine. Consequently, a need still exists for a construction for more effectively controlling clearances of rotor blade-shroud clearances.

SUMMARY OF THE INVENTION

The present invention provides a clearance control assembly designed to satisfy the aforementioned need. The clearance control assembly of the present invention is a mechanical/thermal structural mechanism which maintains minimum compressor rotor blade-shroud clearances over the operating range of the engine. Also, the clearance control assembly improves engine performance and reduces fuel consumption, while at the same time maintaining engine structural integrity.

Accordingly, the present invention is directed to a clearance control assembly in a gas turbine engine which comprises: (a) a plurality of axially arranged adjacent stages of shroud rings, each ring being composed of a plurality of arcuate segments and having axially-displaced opposite fore-and-aft edge portions and circumferentially-displaced opposite side edge portions; (b) means for joining together the opposite fore-and-aft edge portions of axially adjacent shroud rings to permit axial movement of the shroud rings toward and away from one another; (c) an annular housing surrounding the shroud rings in radially outward spaced relation thereto and mounting the segments of the shroud rings for radially positioning the segments by thermal expansion and contraction of the housing in response to flow of temperature-controlled air between the housing and shroud rings; and (d) means located between the housing and shroud rings for defining a plurality of spiral channels for flow of temperature-controlled air about the interior of the housing and exterior of the shroud rings. The assembly also includes means for routing temperature-controlled air to the spiral channels between the housing and shroud segments and means for sealing the space between adjacent side edge portions of circumferentially adjacent shroud ring segments.

More particularly, each shroud ring is composed of at least a pair of semi-cylindrical segments. The housing has a one-piece continuous construction and a cylindrical configuration. Also, the joining means includes a set of interfitting tongue and groove elements defined on respective edge portions of the shroud rings and an annular air seal element disposed in the groove between an inner end of the groove and a terminal end of the tongue. The sealing means includes an axially extending groove defined on the opposite side edge portions of each shroud ring segment and an axially extending air seal element disposed in and spanning between respective adjacent grooves of circumferentially adjacent shroud ring segments. Further, the channel-defining means includes a plurality of raised lands being axially displaced from one another and extending in spiral fashion relative to a longitudinal axis through the shroud rings. The lands can be connected to and protrude from at least the interior of the housing toward the exterior of the shroud rings. Alternatively, the lands can be formed by abutting outer and inner portions respectively connected to and protruding from the interior of the housing and the exterior of the shroud rings. Also, the air routing means includes conduits connected through the housing to and from the spiral channels located therebetween.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Gas Turbine Engine

Figure 1:
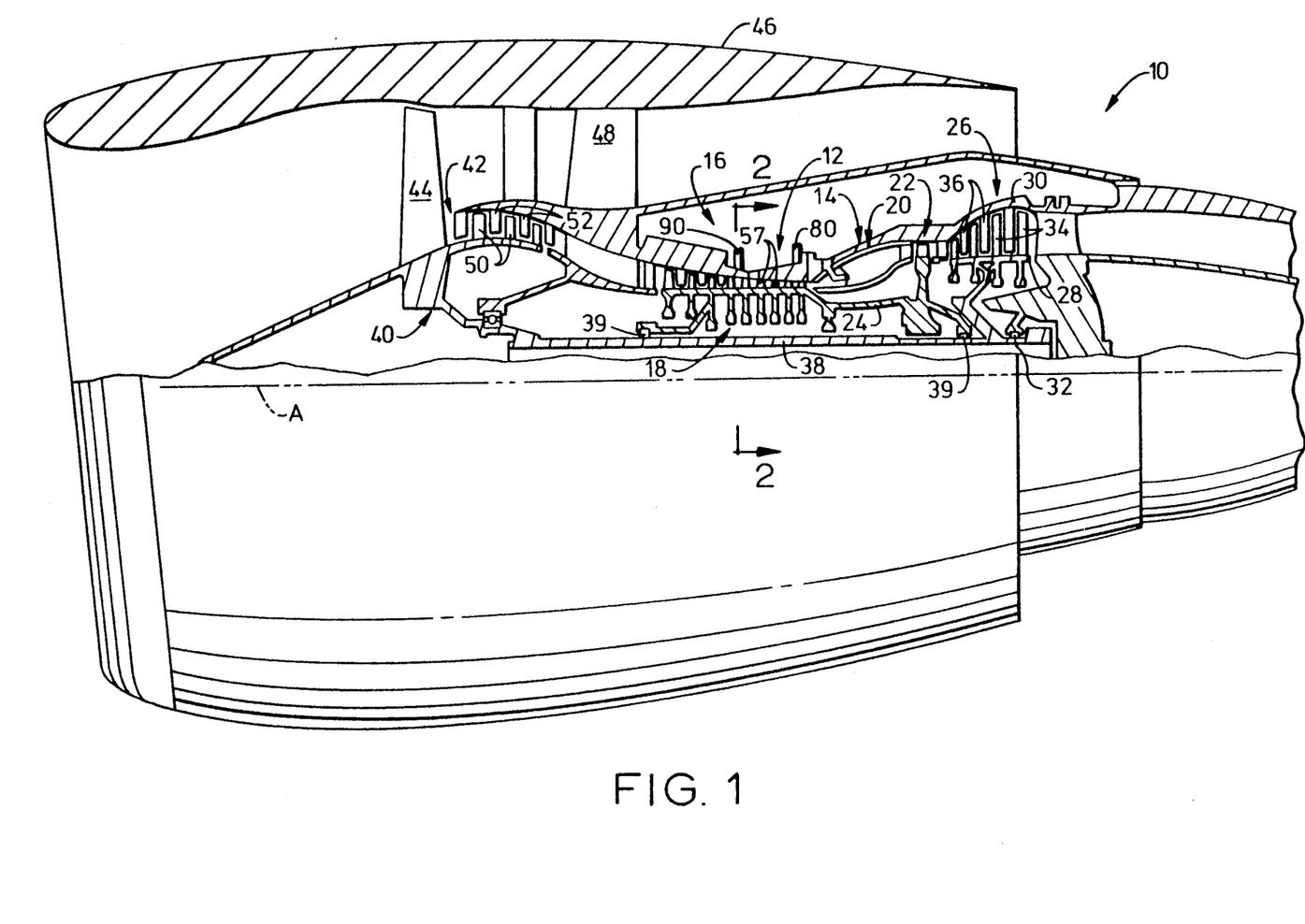
FIG. 1 is a side elevational view of a gas turbine engine with portions broken away and longitudinally sectioned, the engine incorporating a clearance control assembly of the present invention.

Referring now to the drawings, and particularly to FIG. 1, there is illustrated a gas turbine engine, generally designated 10, to which is applied a clearance control assembly 12 of the present invention. The engine 10 has a longitudinal center line or axis A and an outer stationary annular casing 14 disposed coaxially and concentrically about the axis A. The engine 10 includes a core gas generator engine 16 which is composed of a multi-stage compressor 18, a combustor 20, and a high pressure turbine 22, either single or multiple stage, all arranged coaxially about the longitudinal axis or center line A of the engine 10 in a serial, axial flow relationship. An annular outer drive shaft 24 fixedly interconnects the compressor 18 and high pressure turbine 22.

The core engine 16 is effective for generating combustion gases. Pressurized air from the compressor 18 is mixed with fuel in the combustor 20 and ignited, thereby generating combustion gases. Some work is extracted from these gases by the high pressure turbine 22 which drives the compressor 18. The remainder of the combustion gases are discharged from the core engine 16 into a low pressure power turbine 26.

The low pressure turbine 26 includes an annular drum rotor 28 and a stator 30. The rotor 28 is rotatably mounted by suitable bearings 32 and includes a plurality of turbine blade rows 34 extending radially outwardly therefrom and axially spaced. The stator 30 is disposed radially outwardly of the rotor 28 and has a plurality of stator vane rows 36 fixedly attached to and extending radially inwardly from the outer stationary casing 14. The stator vane rows 36 are axially spaced so as to alternate with the turbine blade rows 34. The rotor 28 is fixedly attached to an inner drive shaft 38 and interconnected to the outer drive shaft 24 via the differential bearings 39.

The inner drive shaft 38, in turn, rotatably drives a forward booster rotor 40 which forms part of a booster compressor 42 and which also supports forward fan blade rows 44 that are housed within a nacelle 46 supported about the stationary outer casing 14 by a plurality of struts 48, only one of which is shown. The booster compressor 42 is comprised of a plurality of booster blade rows 50 fixedly attached to and extending radially outwardly from the booster rotor 40 for rotation therewith and a plurality of booster stator vane rows 52 fixedly attached to and extending radially inwardly from the stationary outer casing 14. Both the booster blade rows 50 and the stator vane rows 52 are axially spaced and so arranged to alternate with one another.

Clearance Control Assembly of Present Invention

Referring now to FIGS. 2-5, there is illustrated in detail the clearance control assembly 12 incorporated, for example, in the latter, or aft, stages of the multi-stage compressor 18 of the gas turbine engine 10. Basically, the clearance control assembly 12 includes a plurality of axially arranged adjacent stages of cylindrical turbine shroud rings 54, and an annular housing 56 surrounding the shroud rings 54 in radially outward spaced relation thereto. Each shroud ring 54 is composed of a plurality of arcuate or semi-arc segments 58, 60, preferably, these arcuate segments are in sets of 180° or less (see FIGS. 2 and 4). Each segment 58, 60 has axially-displaced opposite fore-and-aft edge portions and circumferentially-displaced opposite side edge portions. The annular housing 56 preferably is a sleeve 56 having a one-piece continuous construction and a cylindrical configuration. The shroud rings 54 rigidly mount vanes 55 which extend radially inwardly toward the axis A of the engine and which alternate with rotor blades 57 of the compressor 20.

The annular housing 56 surrounds and mounts the segments 58, 60 of the rings 54. Means for attaching each shroud segment 58, 60 to the annular housing 56 include a groove 62 (FIG. 7) defined by a pair of inturned flanges 64 projecting from the exterior side of each shroud segment 58, 60, a locknut 66 inserted through the groove 62, a hole 68 defined through the annular housing 56, and a bolt 70. When the annular housing 56 is fitted over the shroud rings 54, a number of the bolts 70 are inserted through the holes 68 and then threaded into the internal threads of the locknuts 66 and tightened down. The segments 58, 60 of the shroud rings 54 are radially positioned outwardly from or inwardly toward the blade tips to control gap clearance by thermal expansion and contraction of the housing 56 in response to flow of temperature-controlled air between the housing 56 and shroud rings 54.

Figure 3:
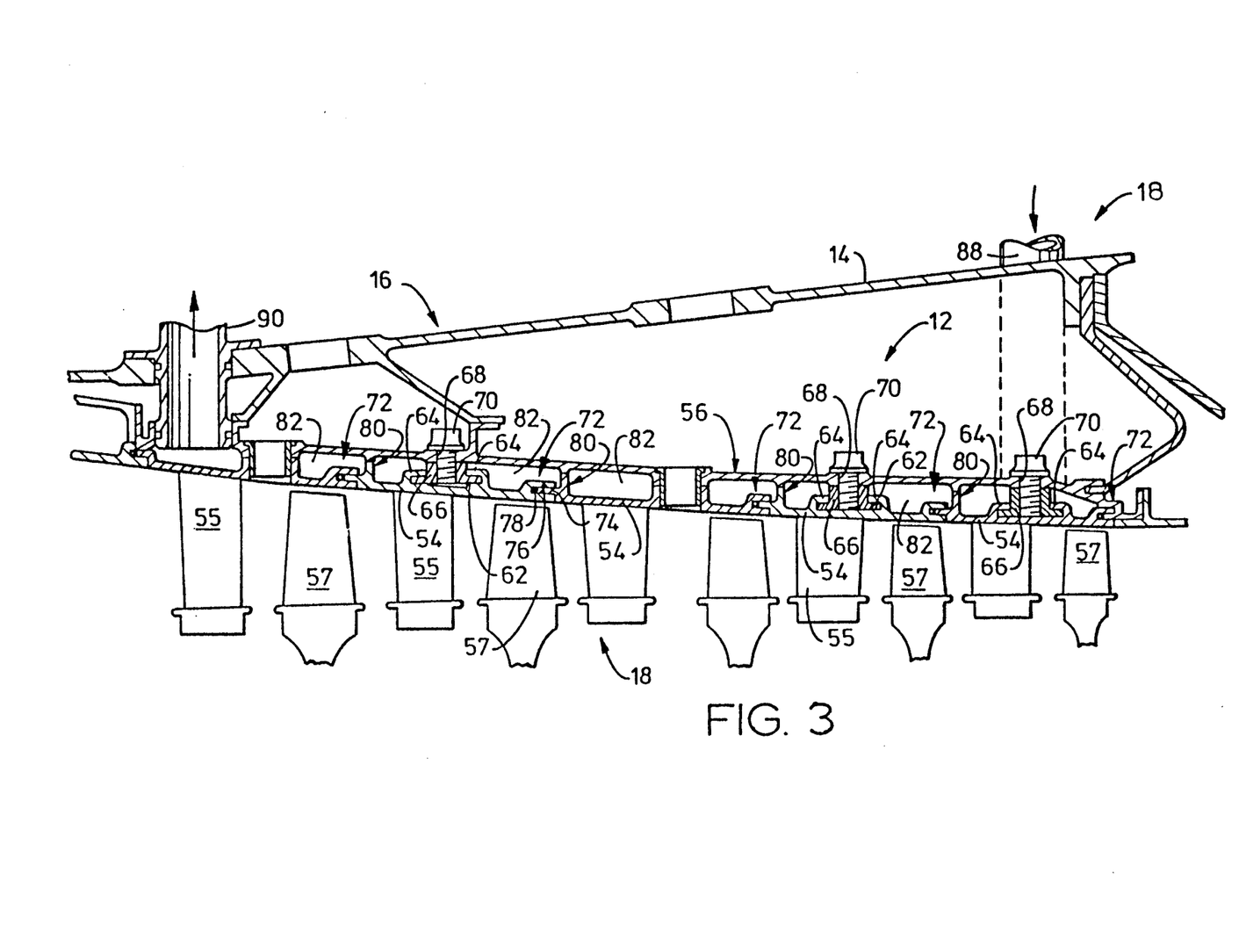
FIG. 3 is an enlarged fragmentary view of the compressor of the engine of FIG. 1, illustrating components of the clearance control assembly.
Figure 4:
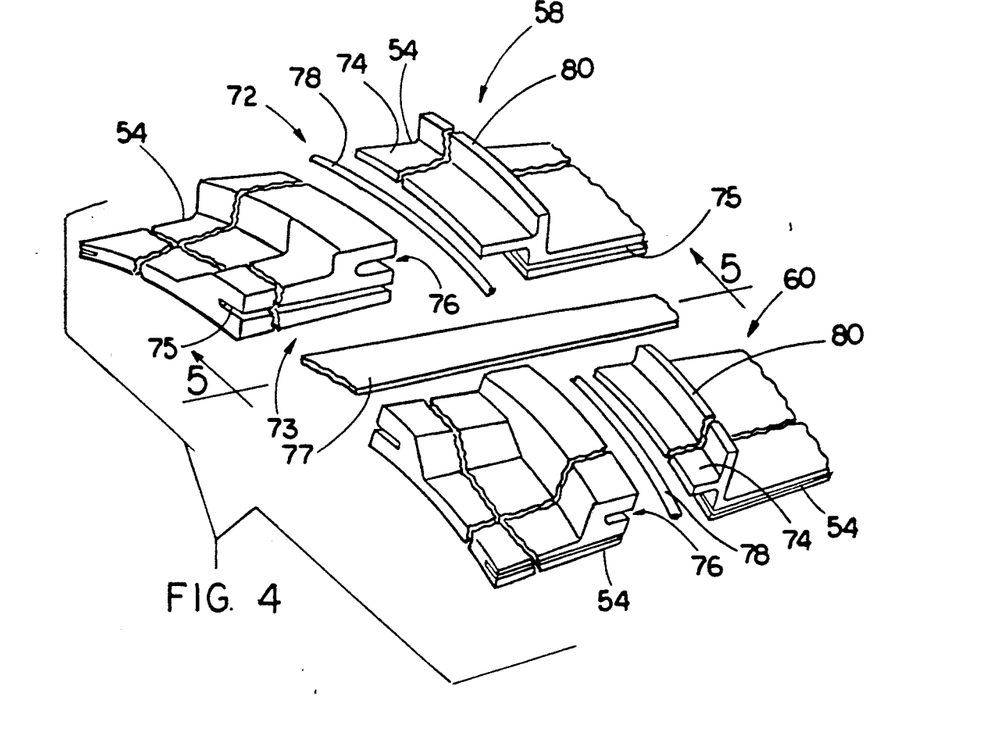
FIG. 4 is an enlarged, exploded, fragmentary view of the circumferentially adjacent shroud ring segments and the axially adjacent shroud rings and the components of the means for joining together the axially adjacent shroud rings and means for sealing between the circumferentially adjacent shroud ring segments.
Figure 5:
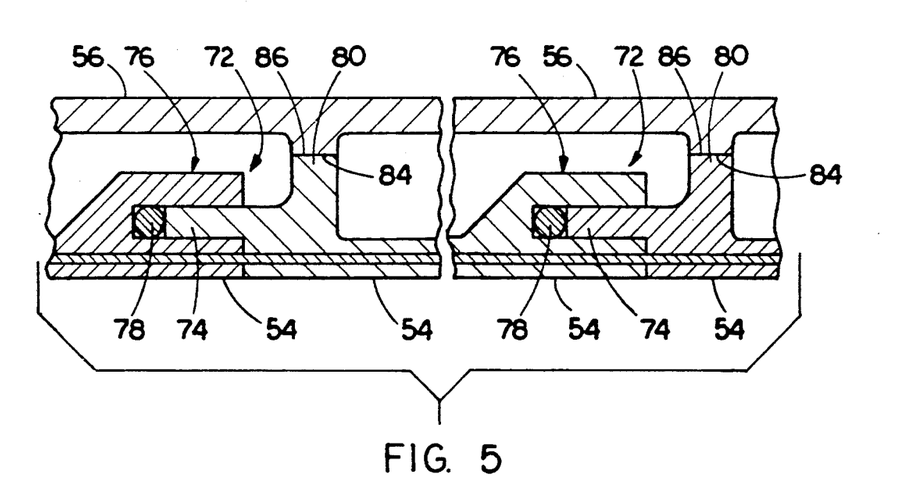
FIG. 5 is an enlarged fragmentary view, as seen along line 5—5 of FIG. 4, of the tongue and groove joints between adjacent opposite edge portions of the shroud rings of the clearance control assembly of FIG. 3.

Referring to FIGS. 3-5, the clearance control assembly 12 also includes means 72 for joining together the opposite fore-and-aft edge portions of the axially adjacent shroud rings 54 to permit axial movement of the shroud rings 54 toward and away from one another as the housing 56 thermally expands and contracts. The joining means 72 includes a set of interfitting tongue and groove elements 74, 76 defined on the respective opposite fore-and-aft edge portions of the shroud rings 54. The joining means 72 also includes an annular air seal element 78 disposed in the groove 76 between an inner end of the groove 76 and a terminal end of the tongue 74. The circular seal element 78 can be composed of a metallic material or a wire braid material. The seal element 78 is positioned and trapped by the tongue and groove elements 74, 76 to prevent air recirculation and assist in the assembling of the rings 54. As best seen in FIGS. 4 and 5, the clearance control assembly 12 also includes sealing means 73 in the form of an axially extending groove 75 defined on each of the opposite side edge portions of each shroud ring segment 58, 60 and a longitudinally or axially extending air seal element 77 disposed in and spanning between respective adjacent grooves 75 of circumferentially adjacent shroud ring segments 58, 60. Preferably, the seal element 77 is a flat leaf seal composed of a thin, flexible metallic material. The sealing means 73 operates to seal the adjacent side edge portions of circumferentially adjacent shroud ring segments 58, 60 during radial positioning of the segments by thermal expansion and contraction of the housing 56 in response to flow of temperature-controlled air between the housing 56 and the shroud rings 54.

Figure 6:
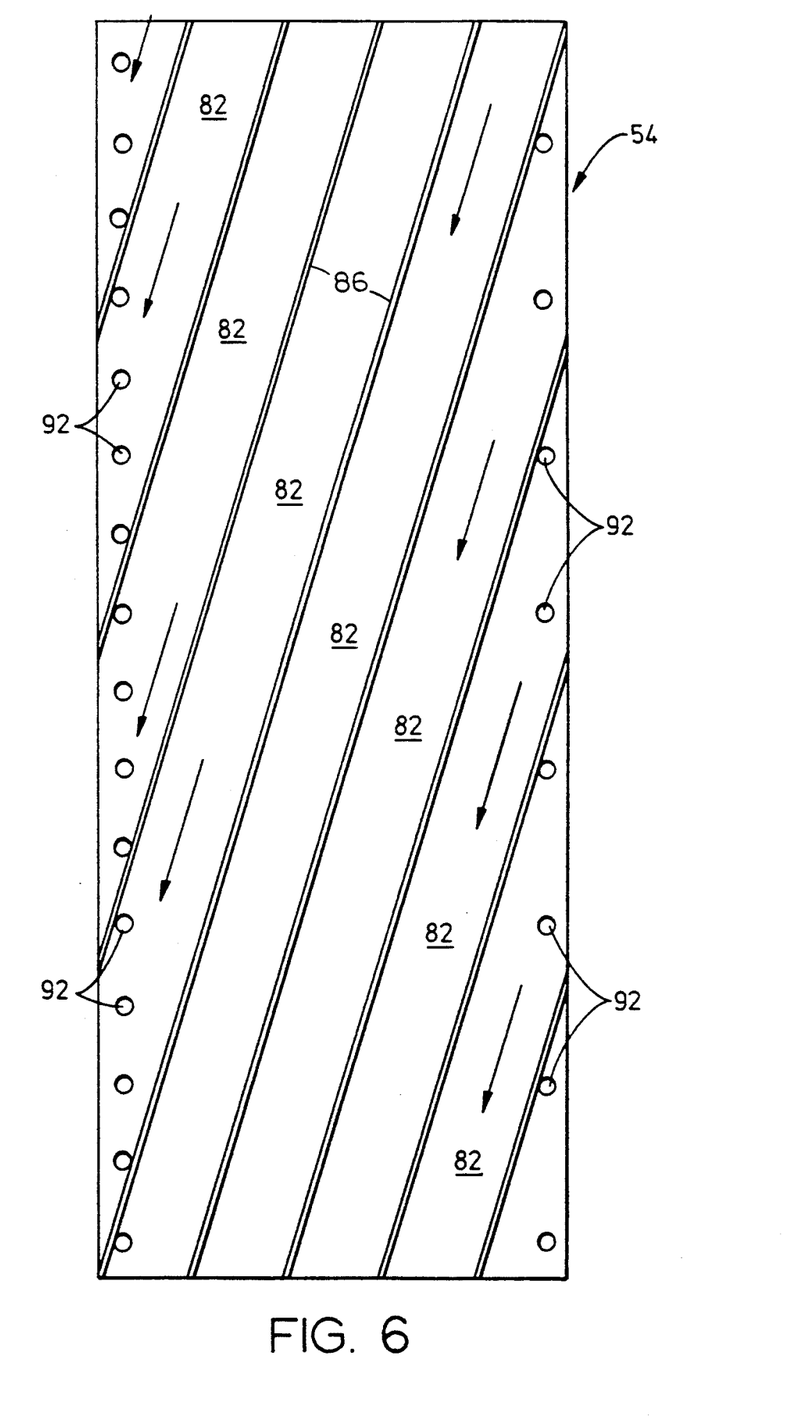
FIG. 6 is a schematic planar layout of a one-piece continuous cylindrical housing of the clearance control assembly of FIG. 3, illustrating a plurality of spiral air flow channels formed by the assembly.
Figure 7:
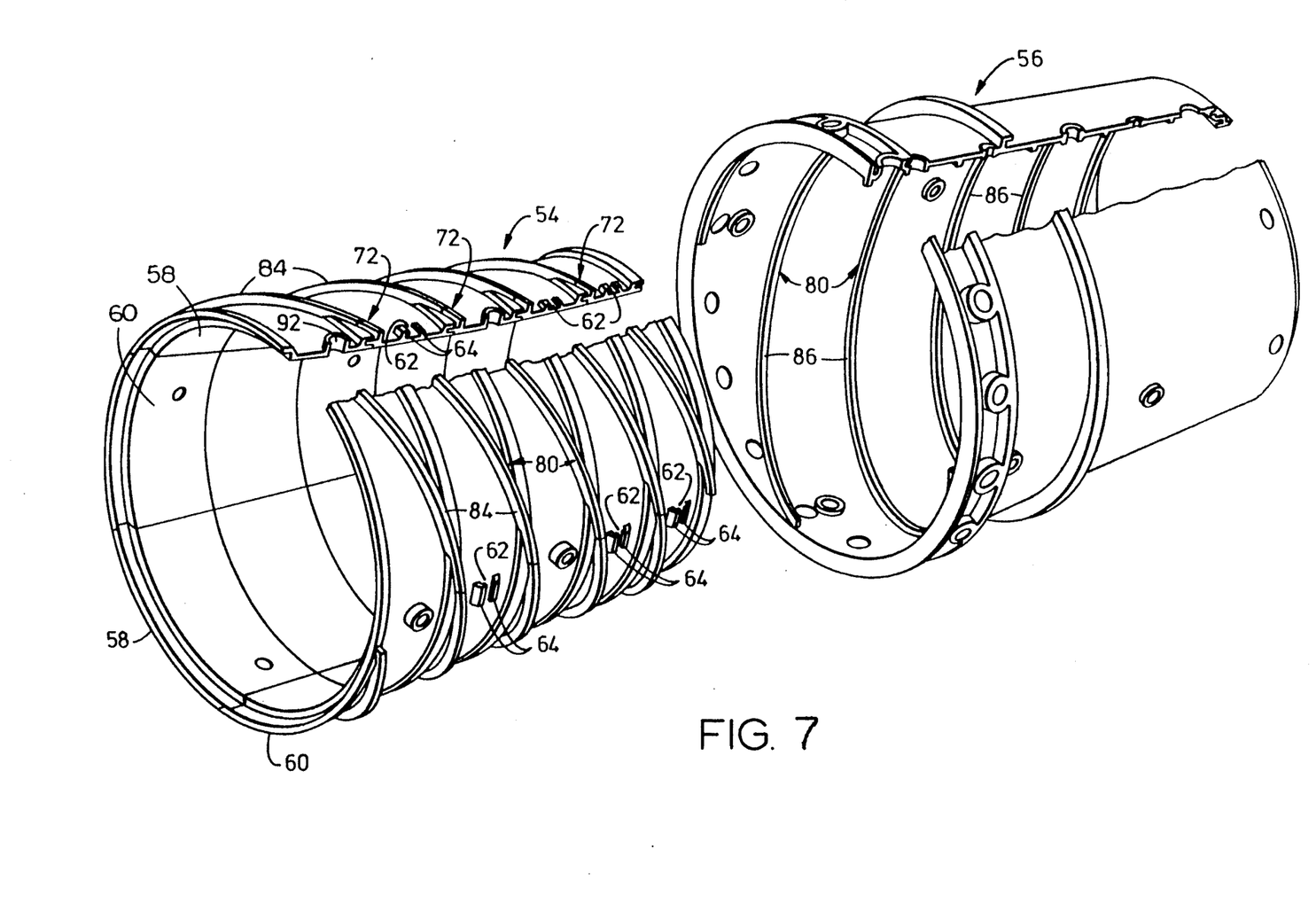
FIG. 7 is an enlarged exploded view of the one-piece cylindrical housing and a plurality of axial stages of shroud segments which together form the clearance control assembly of FIG. 3.

Referring again to FIGS. 2-6, the clearance control assembly 12 further includes means in the form of a plurality of raised lands 80 located between the housing 56 and shroud rings 54 for defining a plurality of spiral channels 82, best seen in FIGS. 6 and 7, for air flow about the space between the interior of the housing 56 and exterior of the shroud rings 54. The raised lands 80 are axially displaced from one another and extend in spiral fashion relative to the axis A of the engine 10 and the shroud rings 54. As illustrated in FIGS. 3, 5 and 7, the lands 80 each includes inner and outer land portions 84, 86 respectively fixed to the interior of the housing 56 and exterior of the shroud rings 54. The inner and outer land portions 84, 86 protrude outwardly from the respective shroud rings 54 and housing 56 and toward one another when the housing 56 is disposed over the shroud rings 54. The spiral channels 82 defined between successive lands 80 form twisting or spiralling air passages for efficiently for heating or cooling the housing 56 so as to expand or contract the diameter of the housing 56 as desired to control the clearance between the segments 58, 60 of the shroud rings 54 and the tips of the blades 57. It should be readily apparent that, alternatively, the raised lands 80 could be formed entirely on the interior of the housing 56 or on the exterior of the shroud rings 54.

Figure 2:
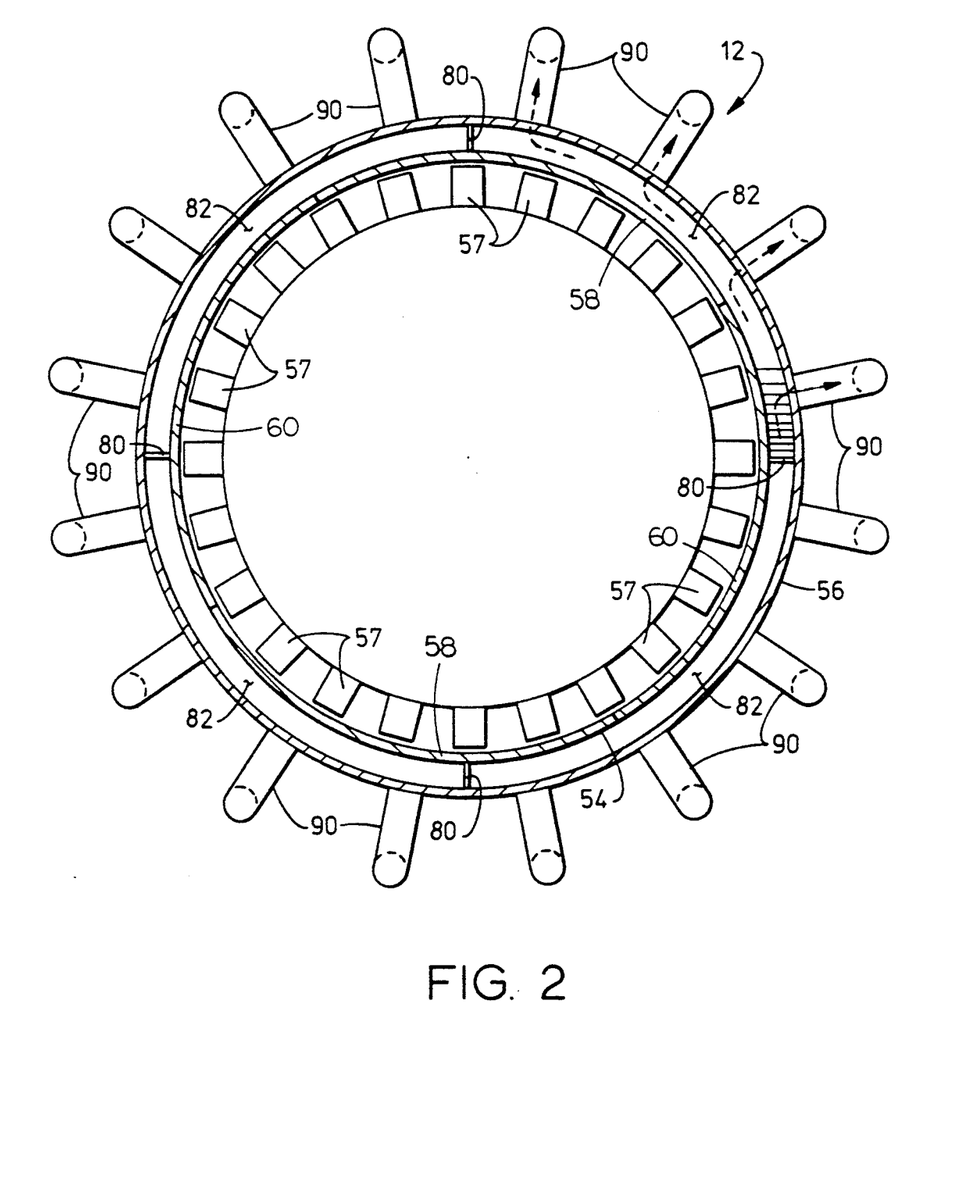
FIG. 2 is an enlarged cross-sectional view of the engine compressor taken along line 2—2 of FIG. 1.

Finally, referring to FIGS. 1-3, means in the form of entry and exit conduits 88, 90 are mounted through the outer casing 14 and connected to the opposite end portions of the housing 56. The entry and exit conduits 88, 90 communicate with holes 92 in the housing 56 and route temperature-controlled air to and from the spiral channels 82 between the housing and shroud segments. The entry conduits 88 are connected to any suitable source of temperature-controlled air on the engine, such as compressor interstage air. The air quantity and temperature will be a function of the amount of rotor blade tip-shroud ring clearance desired.

The clearance control assembly 12, as described above, is a mechanical/thermal structural mechanism which maintains minimum compressor rotor blade-shroud clearances over the operating range of the engine. Also, the clearance control assembly improves engine performance and reduces fuel consumption, while at the same time maintaining engine structural integrity. The advantages provided by the clearance control assembly 12 which improved engine performance are: (1) controls closer blade tip-shroud clearances and no casing ovalization; (2) provides large reduction in recirculated air around compressor; (3) provides uniform heating/cooling of compressor aft, inner casing; (4) provides blade containment; (5) improves casing structural integrity; (6) lowers weight and has fewer parts; and (7) integrates compressor air bleed ports.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. A clearance control assembly in a gas turbine engine, comprising;
    (a) a plurality of axially arranged adjacent stages of cylindrical turbine shroud rings, each ring having an exterior and being composed of a plurality of arcuate segments and having axially-displaced opposite fore-and-aft edge portions;
    (b) means for joining together said opposite fore-and-aft edge portions of axially adjacent shroud rings to permit axial movement of said shroud rings toward and away from one another;
    (c) an annular housing surrounding said shroud rings and having an interior disposed in radially outward spaced relation from said exterior of said shroud rings and having means for mounting said segments of said shroud rings for radially positioning said segments by thermal expansion and contraction of said housing in response to flow of temperature-controlled air between said housing and shroud rings; and
    (d) means connected to and projecting from at least one of said interior of said housing or exterior of said shroud rings and being located between said housing and shroud rings for defining a plurality of spiral channels for flow of temperature-controlled air about the interior of said housing and exterior of said shroud rings.

2. The assembly as recited in claim 1, further comprising:

means for routing temperature-controlled air to and from said spiral channels between said housing and shroud rings.

3. The assembly as recited in claim 1, wherein each said shroud ring is composed of at least a pair of semi-arcuate segments.

4. The assembly as recited in claim 1, further including means for sealing between circumferentially adjacent shroud ring segments to prevent air leakage therebetween as said segments are positioned radially by said thermal expansion and contraction of said housing.

5. The assembly as recited in claim 4, wherein each of said shroud ring segments has circumferentially-displaced opposite side edge portions and said sealing means includes a groove defined on each said side edge portion and an air seal element disposed in and spanning between respective adjacent grooves of circumferentially adjacent shroud ring segments.

6. The assembly as recited in claim 5, wherein said air seal element is a thin flat element composed of a flexible metallic material.

7. The assembly as recited in claim 1, wherein said housing has a one-piece continuous construction and a cylindrical configuration.

8. The assembly as recited in claim 1, wherein said channel-defining means includes a plurality of raised lands being axially displaced from one another and extending in spiral fashion relative to a longitudinal axis through said shroud rings.

9. The assembly as recited in claim 8, wherein said lands protrude outwardly from at least one of the interior of said housing or exterior of said shroud ring and are located between said housing and shroud rings for defining a plurality of spiral channels for flow of air about the interior of said housing and exterior of said shroud rings.

10. The assembly as recited in claim 2, wherein said air routing means includes conduits connected through said housing to said spiral channels located therebetween.

11. A clearance control assembly in a gas turbine engine, comprising:
   (a) a plurality of axially arranged adjacent stages of cylindrical turbine shroud rings, each ring having an exterior and being composed of at least a pair of semi-cylindrical segments and having axially-displaced opposite fore-and-aft edge portions and circumferentially-displaced opposite side edge portions;
   (b) means for joining together said opposite fore-and-aft edge portions of adjacent shroud rings to permit axial movement of said shroud rings toward and away from one another;
   (c) a one-piece continuous cylindrical housing surrounding said shroud rings and having an interior disposed in radially outward spaced relation from said exterior of said shroud rings and having means for mounting said segments of said shroud rings for radially positioning said segments by thermal expansion and contraction of said housing in response to flow of temperature-controlled air between said housing and shroud rings;
   (d) means connected to and projecting from at least one of said interior of said housing or exterior of said shroud rings and being located between said housing and shroud rings for defining a plurality of spiral channels for flow of air about the interior of said housing and exterior of said shroud rings; and
   (e) means for routing temperature-controlled air to and from said spiral channels between said housing and shroud rings.

12. The assembly as recited in claim 11, wherein said channel-defining means includes a plurality of raised lands being axially displaced from one another and extending in spiral fashion relative to a longitudinal axis through said shroud rings.

13. The assembly as recited in claim 12, wherein said lands protrude outwardly from at least one of the interior of said housing or exterior of said shroud ring and being located between said housing and shroud rings for defining a plurality of spiral channels for flow of air about the interior of said housing and exterior of said shroud rings.

14. The assembly as recited in claim 11, wherein said air routing means includes conduits connected through said housing to said spiral channels located therebetween.

15. The assembly as recited in claim 11, further including means for sealing between circumferentially adjacent shroud ring segments to prevent air leakage therebetween as said segments are positioned radially by said thermal expansion and contraction of said housing.

16. The assembly as recited in claim 15, wherein said sealing means includes a groove defined on each said side edge portion and an air seal element disposed in and spanning between respective adjacent grooves of said circumferentially adjacent shroud ring segments.

17. The assembly as recited in claim 16, wherein said air seal element is a thin flat element composed of a flexible metallic material.

18. A clearance control assembly in a gas turbine engine, comprising:
   (a) a plurality of axially arranged adjacent stages of cylindrical turbine shroud rings, each ring being composed of a plurality of arcuate segments and having axially-displaced opposite fore-and-aft edge portions;
   (b) means for joining together said opposite fore-and-aft edge portions of axially adjacent shroud rings to permit axial movement of said shroud rings toward and away from one another, said joining means including
      (i) a set of interfitting tongue and groove elements defined on said respective fore-and-aft edge portions of said shroud rings, and
      (ii) an annular air seal element disposed in said groove between an inner end of said groove and a terminal end of said tongue;
   (c) an annular housing surrounding said shroud rings in radially outward spaced relation thereto and mounting said segments of said shroud rings for radially positioning said segments by thermal expansion and contraction of said housing in response to flow of temperature-controlled air between said housing and shroud rings; and
   (d) means located between said housing and shroud rings for defining a plurality of spiral channels for flow of temperature-controlled air about the interior of said housing and exterior of said shroud rings.

19. A clearance control assembly in a gas turbine engine, comprising:
   (a) a plurality of axially arranged adjacent stages of cylindrical turbine shroud rings, each ring being composed of at least a pair of semi-cylindrical segments and having axially-displaced opposite fore-and-aft edge portions and circumferentially-displaced opposite side edge portions;

(b) means for joining together said opposite fore-and-aft edge portions of adjacent shroud rings to permit axial movement of said shroud rings toward and away from one another, said joining means including (i) a set of interfitting tongue and groove elements defined on said respective fore-and-aft edge portions of said shroud rings, and (ii) an annular air seal element disposed in said groove between an inner end of said groove and a terminal end of said tongue;

(c) a one-piece continuous cylindrical housing surrounding said shroud rings in radially outward spaced relation thereto and mounting said segments of said shroud rings for radially positioning said segments by thermal expansion and contraction of said housing in response to flow of temperature-controlled air between said housing and shroud rings;

(d) means located between said housing and shroud rings for defining a plurality of spiral channels for flow of air about the interior of said housing and exterior of said shroud rings; and (e) means for routing temperature-controlled air to and from said spiral channels between said housing and shroud rings.

* * * * *